H. H. SUNVOLD.
REAR AXLE TRUSS.
APPLICATION FILED NOV. 12, 1914.
1,144,443.
Patented June 29, 1915.
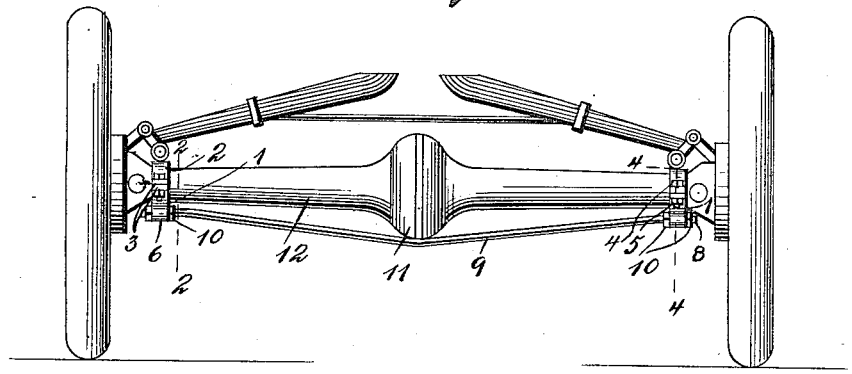
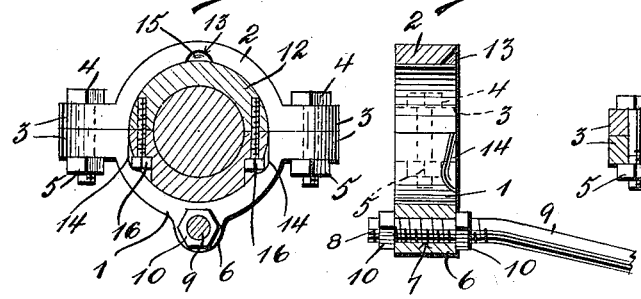 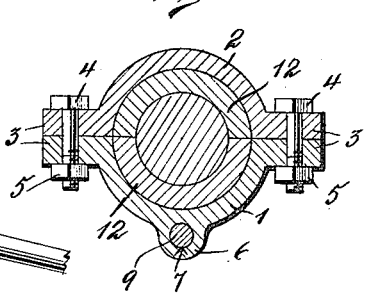
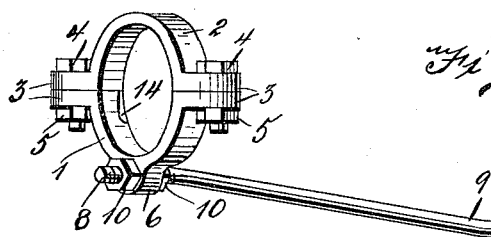 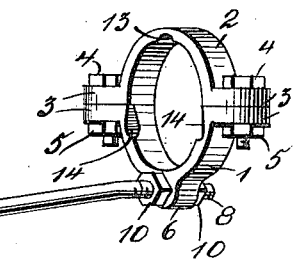
Witnesses
D. E. Strobel
F. H. B. Vrooman
Inventor
Herman H. Sunvold
By E. E. Vrooman & Co.,
his Attorneys

UNITED STATES PATENT OFFICE.

HERMAN H. SUNVOLD, OF SACRED HEART, MINNESOTA.

REAR-AXLE TRUSS.

1,144,443.  Specification of Letters Patent.  Patented June 29, 1915.

Application filed November 12, 1914. Serial No. 871,770.

*To all whom it may concern:*

Be it known that I, HERMAN H. SUNVOLD, a citizen of the United States of America, residing at Sacred Heart, in the county of Renville and State of Minnesota, have invented certain new and useful Improvements in Rear-Axle Trusses, of which the following is a specification, reference being had therein to the accompanying drawing.

This invention relates to rear axle trusses for automobiles and has for its principal object the production of a simple and efficient improvement upon my prior Patent #1,108,812.

Another object of this invention is the production of a rear axle truss which is so formed as to brace the rear axle of an automobile and which is provided with means for positively and efficiently retaining the truss from shifting upon the rear axle after the same has been positioned thereon.

A still further object of this invention is the production of a rear axle truss in which the clamping portions thereof are provided with receiving portions for fitting upon the axle housing and engaging the nuts and rivets thereof whereby the truss will be retained in its correct position for positively holding the brace rod in its correct position upon the axle housing.

With these and other objects in view, this invention consists of certain novel combinations, constructions, and arrangements of parts as will be hereinafter fully described and claimed.

In the accompanying drawings:—Figure 1 is an elevation of the rear axle truss showing the same in position upon the rear axle of an automobile. Fig. 2 is a section taken on the line 2—2 of Fig. 1. Fig. 3 is a transverse section through one of the clamping portions of the truss. Fig. 4 is a section taken on the line 4—4 of Fig. 1. Fig. 5 is a detailed perspective view of the improved axle truss.

Referring to the accompanying drawings by numerals it will be seen that the truss comprises a pair of clamps for supporting the brace rod in its correct position. Each clamp comprises the primary or lower section 1 and the auxiliary or upper section 2. These sections are substantially semi-circular in shape and have the ears 3 formed integrally thereon and extending outwardly therefrom whereby when the clamps are in an assembled position the ears will bear upon each other. In order to retain the two sections of the clamp in position, bolts 4 may be passed through these ears so as to carry the nuts 5 as clearly shown in Fig. 4 whereby the two sections will be positively held in engagement with each other.

Each primary section 1 has an integral lug 6 depending from its lower portion and in this there is formed an opening 7 through which the threaded end 8 of the brace rod 9 passes. Clamping nuts 10 are carried by the threaded ends 8 of the brace rod 9 so as to positively retain the brace rod in engagement with the lugs 6 of the primary section 1. These nuts 10 clamp upon each side of the depending lugs 6 as clearly shown in Fig. 3 and thereby hold the brace rod 9 against longitudinal movement. This rod 9 is adapted to engage the gear housing 11 of the axle housing 12 and thereby brace the central portion of the axle housing since the clamps are carried by the outer end portions of the axle housing for retaining the brace rod in position.

In order to retain the clamps against shifting or rotating around the axle housing 12, the auxiliary section 2 of the clamp is provided with the round notch 13 while the lower or primary section 1 of the clamp is provided with the tapering notches 14. These round notches 13 of the auxiliary section of the clamp will fit over the head 15 of the usual rivets used in constructing the axle housing 12. The tapering notches 14 of the primary section 1 will engage the heads 16 of the bolts or nuts which are ordinarily used in constructing and retaining the axle housing in its correct position. It will be seen that by having the notches 14 tapered, the primary section may be easily slipped on the axle housing in its correct position and may easily accommodate the heads 16 of the bolts.

It will be noted by referring particularly to Fig. 2 that the lower portions of the tapering notches 14 will fit under the heads 16 and thereby one of the other nuts will resist any torsional strain caused by the tendency of the clamp to rotate or the moving of the brace rod from its correct position. By constructing the device in this manner it will be seen that the lugs 6 are formed intermediate the notches and thereby the fitting of the clamp upon the axle housing so as to allow the nuts to receive the heads of the bolts will cause the clamps to be positively retained in their correct positions so as to cause the brace rod 9 to extend beneath the axle housing and engage the lower portion of the gear housing 11 and positively brace the central portions of the axle and axle housing.

From the foregoing description it will be seen that I have produced a very simple and efficient improvement over my prior Patent #1,108,812 in which the brace rod will be so carried as to extend beneath the axle and brace the same while the clamps are provided with simple and efficient means for retaining the same from shifting from their correct positions.

What I claim is:—

1. In a device of the class described, the combination of an axle housing, a pair of sectional clamps carried by said housing, a depending lug formed upon one section of each clamp, a brace rod carried by said lugs, said clamps provided with tapering notches having enlarged base portions formed in alinement with each other, said notches being adapted to receive a plurality of bolt heads used in assembling said axle housing, whereby the bolt heads will engage the base portions of said notches thereby positively holding said clamps against rotation upon said housing for retaining said rod in a set position.

2. In a device of the class described, the combination of an axle housing, a pair of sectional clamps carried by said housing, a depending lug formed upon each clamp, a brace rod carried by said lugs, said clamps provided with tapering notches formed upon their inner portions contiguous to their inner side edges, said notches having enlarged base portions, said notches being adapted to receive a plurality of bolt heads used in assembling said axle housing, whereby the bolt heads will engage the base portions of said notches for holding said clamps against rotation as well as prevent the truss from creeping upon said axle housing.

In testimony whereof I hereunto affix my signature in presence of two witnesses.

HERMAN H. SUNVOLD.

Witnesses:
G. P. MANGERUD,
HANS H. RISTVEDT.

Copies of this patent may be obtained for five cents each, by addressing the "Commissioner of Patents, Washington, D. C."